United States Patent [19]

Brandenstein et al.

[11] Patent Number: 4,560,051
[45] Date of Patent: Dec. 24, 1985

[54] HYDRAULICALLY ACTUATED CLUTCH THROW-OUT

[75] Inventors: Manfred Brandenstein, Eussenheim; Roland Haas, Hofheim, both of Fed. Rep. of Germany; Hein Hartmann, Maartensdijk, Netherlands

[73] Assignee: SKF Kugellagerfabriken GmbH, Schweinfurt, Fed. Rep. of Germany

[21] Appl. No.: 598,882

[22] Filed: Apr. 10, 1984

[30] Foreign Application Priority Data

Apr. 15, 1983 [DE] Fed. Rep. of Germany ... 8311155[U]

[51] Int. Cl.⁴ ............................ F15B 7/00; F16D 25/06
[52] U.S. Cl. ................................. 192/98; 192/85 CA; 192/91 A; 192/110 B
[58] Field of Search ............... 192/85 CA, 91 A, 98, 192/110 B, 101, 91 R; 92/107, 108, 165 PR, 130 C

[56] References Cited

U.S. PATENT DOCUMENTS 4,498,566 2/1985 Renand ............................ 192/110 B

FOREIGN PATENT DOCUMENTS 2389799 1/1979 France ..................................... 192/98
1336564 11/1973 United Kingdom .
2062799 5/1981 United Kingdom .......... 192/85 CA
2088010 6/1982 United Kingdom .......... 192/85 CA Primary Examiner—Martin P. Schwadron
Assistant Examiner—Stephen M. Hepperle
Attorney, Agent, or Firm—Daniel M. Rosen

[57] ABSTRACT

An hydraulically actuated clutch release, in particular for automobile clutches, comprising a housing having a cylindrical portion and a flange in which a port for the intake of a pressure medium is incorporated, a cylindrical sleeve, an annular piston having a flange and slidably arranged between the cylindrical sleeve and the cylindrical portion of the housing, thereby forming a pressure medium-admitting chamber, a clutch release bearing having a non-rotating bearing ring, an outer cylindrical sleeve, and a compression ring. The outer cylindrical sleeve comprises two portions of different inner diameter and a bead connecting the portions. One portion fixedly contacts the non-rotating bearing ring and the end face of the annular piston flange, and the other portion covers a portion of the outer sliding surface of the annular piston. The compression spring is arranged between the bead of the outer cylindrical sleeve and the flange of the housing.

10 Claims, 3 Drawing Figures

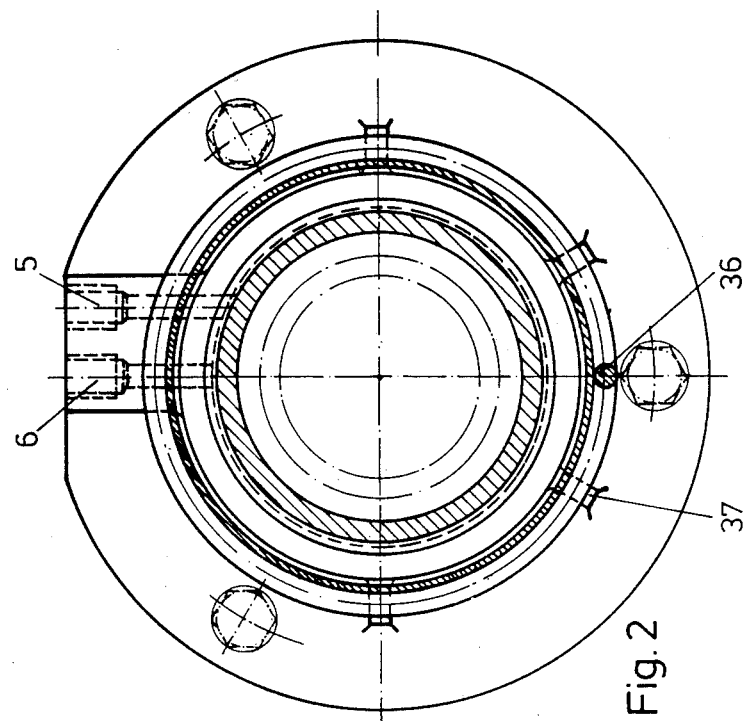
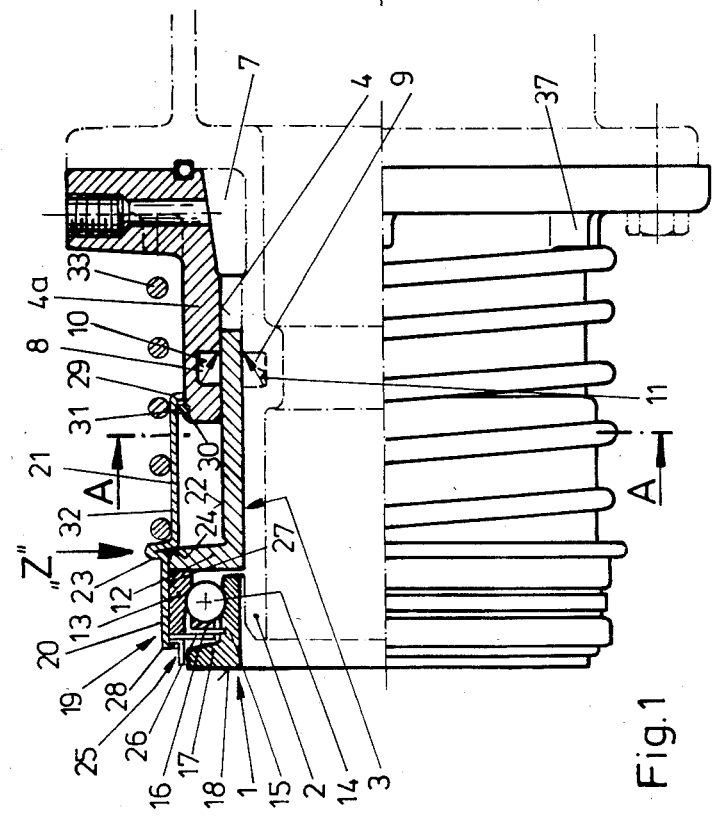
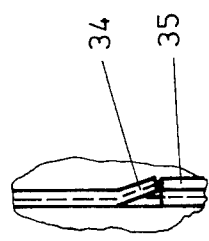
Fig. 1
Fig. 2
Fig. 3

HYDRAULICALLY ACTUATED CLUTCH THROW-OUT

BACKGROUND OF THE INVENTION

The invention relates to an hydraulically activated clutch release, especially for automobile clutches, which comprises a cylindrical housing and an annular piston arranged on a cylindrical sleeve, the piston being connected to the clutch release bearing.

A clutch release of the above-described type is disclosed, for example, in DE-GM No. 7044281. This known device has relatively complicated components which can become separated during travel.

SUMMARY OF THE INVENTION

The present invention is therefore directed to the solution of the problem of creating an hydraulically actuated clutch release comprised of simply fabricated parts which are held together by suitable means.

In accordance with the invention, this problem is solved by providing an hydraulically actuated clutch release of the aforementioned type wherein the annular piston has a flange which abuts the end face of the non-rotating bearing ring facing away from the clutch. The annular piston is connected to the non-rotating bearing ring by means of a sleeve having a portion for receiving the non-rotating bearing ring and the flange connected to the annular piston, as well as a portion for covering the sliding surface of the annular piston.

In accordance with further features of the invention, the sleeve is provided with a bead, which is engaged by a compression spring arranged on the outer surface of the sleeve and of the cylindrical housing. One end of the compression spring abuts an axially bent partially cut-out portion of the bead so that the annular piston and non-rotating bearing ring of the clutch release bearing are secured against relative rotation.

In addition, the rim of the sleeve portion surrounding the cylindrical housing can be bent radially inward in a suitable conventional manner, so that it engages a slotted spring ring inserted in an annular groove of the cylindrical housing when the annular piston is in its most axially extended position. In this way the annular piston, the clutch release bearing, and the cylindrical housing are held together as a unit.

BRIEF DESCRIPTION OF THE DRAWINGS

The invention will be described in greater detail with reference to the accompanying drawings, wherein:

FIG. 1 is a side view of an hydraulically actuated clutch release in accordance with the invention, in which the upper half is shown in sectional view;

FIG. 2 shows a view along section A—A of the clutch release shown in FIG. 1;

FIG. 3 shows an enlarged cut-away view according to FIG. 1.

DETAILED DESCRIPTION OF THE PREFERRED EMBODIMENT

The hydraulically actuated release arrangement for clutches, in particular for automobile clutches, depicted in FIGS. 1-3 comprises a clutch release bearing 1 and an annular piston 3 slidably arranged on a cylindrical sleeve 2 (indicated by a dash-dot line), the piston 3 extending into the bore 4 of a cylindrical housing 4a. The cylindrical housing 4a is provided with a port 5 for the supply of a pressure medium and with a pressure release port 6, which are connected to a pressure medium-admitting annular chamber 7. The annular chamber 7 is sealed by means of two sealing rings 8 and 9, arranged in annular grooves 10 and 11 of cylindrical housing 4a and cylindrical sleeve 2 respectively, and abut the outer surface and bore surface respectively of annular piston 3.

The outer ring 13 of the clutch release bearing is attached to the radially outwardly extending flange 12 of annular piston 3, with the bearing balls 14 arranged in a cage between the non-rotating outer ring 13 and the rotating inner ring 15. The thrust flange 17 of inner ring 15 is provided with a contacting surface 18 for the clutch diaphragm spring (not shown). The coupling of the clutch release bearing 1 with the annular piston 3 is achieved by means of a cylindrical sleeve 19. This sleeve 19 has a portion 20 for receiving the outer ring 13 and flange 12 as well as a portion 21 for covering the sliding surface 22 of annular piston 3. The portions 20 and 21 are connected with each other by a bead 23. The portions 20 and 21 have different inner diameters, so that an abutment surface 24 for engaging the flange 12 of annular piston 3 is formed.

During assembly, after the insertion of the annular piston 3, the clutch release bearing 1, as well as the sealing discs 25 and 26 in the bore 27 of the cylindrical sleeve 19, the rim 28 of sleeve 19 is flanged radially inward. The portion 21 of sleeve 19 engages a slotted wire ring 31 arranged in an annular groove 30 of annular piston 3 by means of a radially inwardly bent rim 29, so that the clutch release bearing 1, the annular piston 3, and the cylindrical housing 4a form an integral unit. A compression spring 33 is arranged on the outer surface 32 of portion 21 of the sleeve 19 and on the cylindrical housing 4a, the spring being supported on one end by the bead 23 and on the other end by a flange on cylindrical housing 4a, thereby ensuring that the rolling elements 14 remain continuously in contact with the races of outer ring 13 and inner ring 15. At a point along the circumference of the bead 23 a portion 34 (FIG. 3) is partially cut out and bent in an axial direction. One end of the spring abuts this portion 34. The other end 36 of the spring is bent to extend axially as seen in FIG. 2, so that it can engage a projection 37 on the cylindrical housing 4a, so that the annular piston 3 and the outer ring 13 are prevented from rotation by means of compression spring 33.

The above-described embodiment represents only one embodiment of an hydraulically actuated release arrangement in accordance with the invention. Modifications may be made in the structure of the component parts without departing from the spirit and scope of the invention.

What is claimed is:

1. In an hydraulically actuated clutch release comprising a clutch release bearing adapted to engage a clutch having a non-rotating bearing ring, a cylindrical housing and a first cylindrical sleeve defining an annular chamber, and an annular piston extending into said chamber, said annular piston being connected to said clutch release bearing, the improvement wherein said annular piston has a flange which abuts said non-rotating bearing ring on the side of the bearing ring away from said clutch, said annular piston being connected to said non-rotating bearing ring by a second cylindrical sleeve, said second cylindrical sleeve having a first portion for receiving said non-rotating bearing ring and said flange and a second portion covering the sliding surface of said annular piston, said housing being radially outwardly of said first sleeve, and further comprising a compression spring arranged on the radially outer surfaces of said second portion of said second sleeve and of said cylindrical housing, said spring abutting said cylindrical housing and urging said flange way from said housing.

2. The clutch release of claim 1, wherein said second cylindrical sleeve has a bead which connects said first and second portions to each other, said first and second portions having different inner diameters, said spring abutting said bead.

3. The clutch release of claim 2, wherein one end of said compression spring engages a protruding portion partially cut out from said bead and bent axially, and the other end of said spring is positioned to engage a protruding portion of said cylindrical housing.

4. The clutch release of claim 2, further comprising a spring ring mounted in an annular groove of said cylindrical housing, said second portion of said second cylindrical sleeve having a radially inwardly directed rim which engages said spring ring when said annular piston is in its axially most remote position with respect to said cylindrical housing.

5. An hydraulically actuated clutch released comprising a housing having a cylindrical portion and a first cylindrical sleeve, said cylindrical portion and first sleeve defining an annular chamber, an annular piston slidably arranged on said first cylindrical sleeve and extending into said chamber, said annular piston having a radially outwardly directed flange, a clutch release bearing having a non-rotating bearing ring and arranged such that one end of said non-rotating bearing ring axially abuts said flange, and a second cylindrical sleeve having a first portion of one inner diameter, a second portion of a lesser inner diameter, and a third portion between said first and second portions, wherein said first portion fixedly abuts said non-rotating bearing ring and said flange, and said second portion covers the radially outer sliding surface of said annular piston and extends to said flange, and a compression spring extending between said flange and housing.

6. The clutch release of claim 5, wherein said third portion of said second cylindrical sleeve comprises a bead formed to connect said first and second portions.

7. The clutch release of claim 5, wherein said housing has a flange in which a port for the intake of a pressure medium is incorporated.

8. The clutch release of claim 7, wherein said housing is radially outwardly of said first sleeve and said compression spring is arranged radially outside said second portion of said second cylindrical sleeve and said cylindrical portion of said housing, and extends between said bead of said second cylindrical sleeve and said flange of said housing.

9. The clutch release of claim 8, wherein one end of said compression ring engages an axially protuding portion of said bead and the other end of said compression ring engages a protruding portion of said flange of said housing to inhibit relative rotation between said non-rotating bearing ring and housing.

10. The clutch release of claim 5, further comprising a spring ring, said spring ring being arranged in an annular groove in said cylindrical portion of said housing, said second portion of said second cylindrical sleeve having a radially inwardly directed rim which engages said spring ring when said annular piston is in its extreme axial position with respect to said housing.

* * * * *